(12) United States Patent
Gey et al.

(10) Patent No.: US 10,661,358 B2
(45) Date of Patent: May 26, 2020

(54) TOOL HEAD FOR A MODULAR SHANK TOOL

(71) Applicant: Kennametal Inc., Latrobe, PA (US)

(72) Inventors: Christoph Gey, Zirndorf (DE); Jürgen Schwägerl, Vohenstrauss (DE)

(73) Assignee: KENNAMETAL INC., Latrobe, PA (US)

( * ) Notice: Subject to any disclaimer, the term of this patent is extended or adjusted under 35 U.S.C. 154(b) by 199 days.

(21) Appl. No.: 15/645,221

(22) Filed: Jul. 10, 2017

(65) Prior Publication Data

US 2018/0126467 A1 May 10, 2018

Related U.S. Application Data

(62) Division of application No. 13/754,426, filed on Jan. 30, 2013, now Pat. No. 9,700,944.

(30) Foreign Application Priority Data

Jan. 31, 2012 (DE) ........................ 10 2012 001 732

(51) Int. Cl.
| | |
|---|---|
| *B23B 51/06* | (2006.01) |
| *B23C 5/28* | (2006.01) |
| *B23B 51/02* | (2006.01) |
| *B23B 27/10* | (2006.01) |
| *B23B 27/14* | (2006.01) |
| *B23P 15/28* | (2006.01) |

(52) U.S. Cl.
CPC ............ *B23B 51/06* (2013.01); *B23B 27/10* (2013.01); *B23B 27/14* (2013.01); *B23B 51/02* (2013.01); *B23C 5/28* (2013.01); *B23P 15/28* (2013.01); *B23B 2251/02* (2013.01); *B23C 2210/02* (2013.01); *B23C 2210/03* (2013.01); *Y10T 407/1904* (2015.01); *Y10T 408/455* (2015.01); *Y10T 408/78* (2015.01); *Y10T 408/89* (2015.01)

(58) Field of Classification Search
CPC ......... B23B 51/02; B23B 51/06; B23B 27/10; B23B 27/14; B23B 2251/02; B23C 5/28; B23C 2210/02; B23C 2210/03; B23P 15/28; Y10T 408/89; Y10T 408/455; Y10T 408/78; Y10T 407/1904
See application file for complete search history.

(56) References Cited

U.S. PATENT DOCUMENTS 4,627,503 A * 12/1986 Horton .................... B23B 51/00
175/420.2

\* cited by examiner

*Primary Examiner* — Phong H Nguyen
(74) *Attorney, Agent, or Firm* — Larry R. Meenan

(57) ABSTRACT

A tool head for use with a modular shank tool includes at least two preforms. Each preform of the at least two preforms is made separately from the other preform of the at least two preforms from granular materials and then put together and jointly compressed and integrally bonded.

16 Claims, 9 Drawing Sheets

TOOL HEAD FOR A MODULAR SHANK TOOL

CROSS-REFERENCE TO RELATED APPLICATIONS

Figure 1:
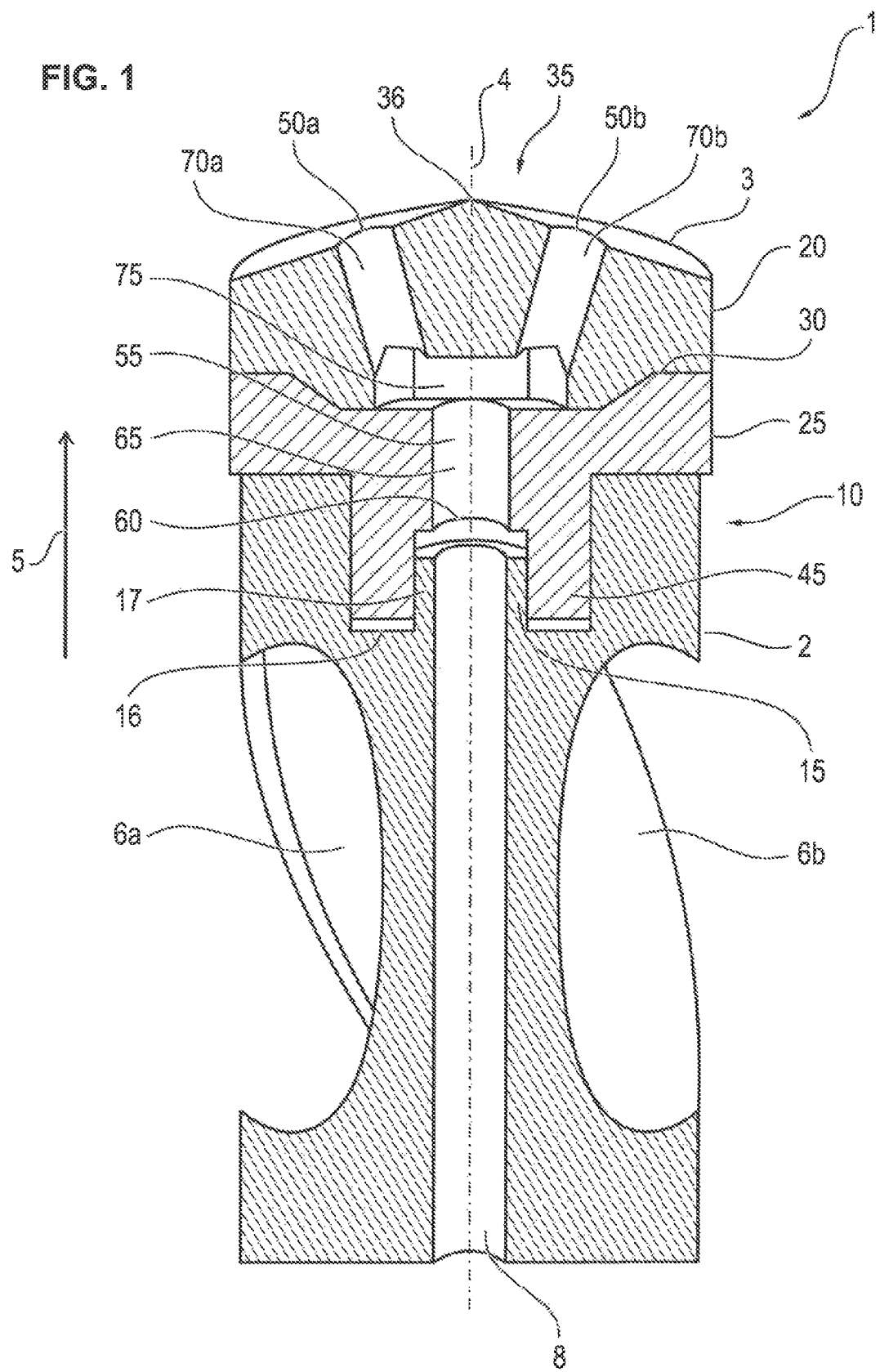

This application under 35 USC § 120 is a division of U.S. patent application Ser. No. 13/754,426, filed on Jan. 30, 2013, which is incorporated herein by reference in its entirety, and which itself claims priority under 35 USC § 119(a) to Federal Republic of Germany Patent Application No. 102012001732.4, filed on Jan. 31, 2012, which is also incorporated herein by reference in its entirety.

BACKGROUND

Field of the Invention

The invention relates to a tool head for a modular shank tool. The invention further relates to a shank tool comprising such a tool head and to a manufacturing method for the tool head.

Background Information

Tools for machine cutting of workpieces, in particular workpieces made of metallic materials, are occasionally used in high-volume production and manufacturing facilities. Machine cutting can basically be divided into two fields. One field is machine cutting with geometrically undefined cutters. Typical methods are here, for instance, grinding and lapping. The other field is machine cutting with geometrically defined cutters, such as, for example, drilling, milling and turning. In terms of the economy of production, the longest possible service life for the tools used is demanded in both fields. The service life of the tools is determined by various, mutually interacting factors. Specifically in the field of geometrically defined cutters, these factors are in part inherent to the particular tool, such as, for example, cutter geometry or tool material, which are both in turn also dependent on a material of the workpiece to be machined. Other factors are occasionally adjustable process conditions, such as, for example, a supply of a cooling lubricant and a cutting speed. Cooling lubricants, as the term implies, serve on the one hand to cool the tool, in particular the cutter, as well as a removed chip, and on the other hand to provide lubrication between the cutter and the workpiece. In addition, however, the cooling lubricants also take care of the evacuation of chips from a cutting zone.

For extremely hard or metallic workpiece materials, tools made of hard metal or tool inserts made of ceramic materials are normally used. In a multistage process, these materials are first pressed from granular raw materials or, in alternative methods, such as, for instance, powder injection molding, are converted into a preform (also "green compact"). This preform is then compressed in a sintering process and "baked" into a solid formed part. Because of the generally expensive high-precision tools, it has proved economic not to exchange the whole tool in the event of excessive wear, but only the heavily loaded, rapidly wearing cutters. For this, tool systems comprising exchangeable tool heads made from hard metals or ceramics are widely used.

Ducts for the supplying of cooling lubricant are occasionally integrated in the tools themselves close to the cutting zone. This is advantageous, in particular, for machine-cutting methods in lower lying workpiece regions, such as, for instance, in bores, since an external cooling lubricant supply at the bottom of the bore is made difficult by the tool itself and the externally supplied cooling lubricant, as it flows into the bore, forces the chips back into the cutting zone.

A simple embodiment of an integrated cooling lubricant supply of this kind is a central bore which runs in the longitudinal axis through the whole of the tool. An improved cooling lubricant supply is achieved, for instance, by two ducts which emerge on the flanks of the tool tip. These ducts are occasionally produced by extrusion methods helically along a spiral of chip grooves of the tools.

For the cooling lubricant supply, complex shapes of the discharge openings and of the ducts for the cooling lubricant are often advantageous in terms of the flow and flow rate of the cooling lubricant and the cooling of the engaging cutters. Disadvantageously, these complex duct structures represent a not insignificant obstacle for the production of the aforementioned hard material tools. Undercuts and complex inner hollow structures can be realized only with increased production complexity. Suitable methods are found, for instance, in the field of so-called Rapid Prototyping or Rapid Tooling methods, in which components are made layer by layer in time-consuming processes, for example from powders.

A tool tip having two openings for the cooling lubricant is known, for instance, from U.S. Pat. No. 3,085,453. There a one-piece tool tip is defined, which is first pressed in a powder-metallurgical method and is then compacted in a sintering process and brought into the final form. The cooling lubricant openings are shaped during the pressing of the powder by a core element in the pressing mold. Next the sintered tool tip is soldered onto a tool shank. A drawback with this method is that only straight ducts for the cooling lubricant can be produced, since no other structures can be formed by the core element in the pressing mold. Otherwise, the core element would no longer be able to be removed from the mold.

A further tool tip, defined in U.S. Pat. No. 6,551,035, likewise comprises ducts for cooling lubricant and is formed from two different materials. The aim of the different materials is to match the cutters of the tool tip to different load intensities. The outer cutter regions are formed from a harder material, since there, due to the higher cutting speed in the case of a rotary tool, greater hardness leads to lower wear. This tool tip is formed in a multi-component injection molding process and is then sintered. That is to say, the two different materials are preformed in a process into a coherent component and are then sintered, whereupon the two materials respectively form a core and a mantle. As in the aforementioned document, the ducts for the cooling lubricant are likewise jointly formed in the injection molding process.

Further known cutter inserts for drilling or milling tools are known, for instance, from U.S. Pat. Nos. 3,422,706; 6,663,326 and US 2010/0021253.

SUMMARY OF THE INVENTION

An object of the invention is to simplify the manufacture of a, in terms of the geometry or a plurality of different tool materials, complex tool head for a modular shank tool. The invention is intended to enable, in particular, a simple manufacture of complex duct systems for an integrated cooling lubricant supply in the tool head.

In accordance with one aspect of the invention, an inventive tool head for a modular shank tool is provided. The tool head is formed from at least two preforms which are made separately from each other from respectively granular material. These preforms are put together and then jointly compressed and are hereupon integrally bonded. In one example embodiment, the granular material is a hard metal or a ceramic raw material. The material is sinterable and suitable for use in the machine cutting of workpieces.

Through the division of the tool head into a plurality of preforms, the production of complex structures is considerably simplified, especially as the tool head can here advantageously be divided into less complex substructures. Due to the integral bonding of the preforms by the joint sintering, a low production complexity is necessary. Connection methods, such as, for example soldering of the individual preforms, after the sintering, and joints associated therewith between the preforms, are not necessary.

In principle, the preforms can be produced from the same material. In an example embodiment, the preforms are produced, however, from different materials. The materials can here differ in terms of their composition or in terms of an altered grain size of otherwise identical basic constituents of the respective material. One advantage of different materials here lies in the fact that the hardness or toughness of the respective preform can be tailored, according to requirements, to a respective region of the tool head. In an example embodiment, the region, for example, which is provided for the connection to the shank tool is made from a high-strength material or from a coarse-grained material, while the region for the machine cutting is preferably made of a hard, fine-grained material. Furthermore, it is also possible to manufacture in the cutter region an (inner) center cutter, and the outer cutter region surrounding the latter, from cutting material having different degrees of hardness.

The tool head comprises, viewed in an axial direction, a front end and a rear end opposite thereto. On the front end, cutters of the tool head are stamped. The front end is therefore hereinafter referred to as the "cutter end". In an example embodiment, a coupling structure, which serves for a precisely fitting connection to the shank tool, is stamped on the rear end. The rear end of the tool head is therefore hereinafter referred to as the "coupling end".

The tool head may be provided for a rotary shank tool. The tool head here has an axially running rotational axis, about which the shank tool in normal operation is rotated. Preferably, the tool head has geometrically defined cutters. The cutter end here comprises at least one main cutter having a flank which, counter to a rotational direction, adjoins the main cutter. In a drilling tool, the cutter end expediently forms a tip through which the rotational axis of the shank tool runs. In this embodiment, the tool head preferably comprises two main cutters, which are connected to each other by a centerline, wherein the centerline runs over the tip of the cutter end. In a milling tool, the cutter end is expediently flatly shaped in a plane running radially to the rotational axis. The cutter end here advantageously comprises at least two main cutters, which are not connected by a centerline.

In another example embodiment, the tool head comprises in the region of the cutter end at least one opening (hereinafter nozzle) for a cooling lubricant. This nozzle is connected by respectively a duct system to correspondingly an (inlet) opening for the cooling lubricant on the coupling end of the tool head. The cooling lubricant is thereby guided directly to a cutting zone of the shank tool.

In a further example embodiment, the tool head comprises at least two nozzles for the cooling lubricant in the region of the cutter end, wherein these nozzles are connected by a branched duct system to an inlet opening on the coupling end. The inlet opening on the coupling end is preferably arranged in the axis of the tool head, since this considerably simplifies the production of a supply line for the cooling lubricant through the shank tool to the tool head. By virtue of two or more nozzles in the tool head, the cooling lubricant is guided more precisely to the regions in which it is primarily needed, in particular into the region of the, where appropriate, plurality of main cutters. The production of the branched duct systems which are necessary for this is substantially simplified by the manufacture of the tool head from a plurality of preforms.

In another example embodiment, the branched duct system is divided such that respectively only straight duct portions are formed in each preform. The production of the respective preforms and of the duct portions is thus considerably simplified, since straight duct portions can be made without great complexity.

In principle, the duct portions on a fork of the duct system can meet at a point. From the production engineering aspect, it is advantageous, however, to provide on the or each fork of the duct system a distributor chamber having a diameter which substantially exceeds the widest duct diameter. The distributor chamber is here advantageously arranged in a connecting area between two preforms. Expediently, the distributor chamber is fully shaped in a preform. The at least two subducts which branch off from the distributor chamber in the direction of the cutter end are realized, in particular, as straight subducts.

The connecting areas between two preforms preferably run approximately perpendicular to the axis of the tool head. Hence no transitions are arranged between the preforms in the region of the cutter end or its tip. The connecting areas of the respective preforms expediently have structures, in particular conical regions or shoulders, so that the preforms, when put together, are automatically centered relative to each other and are oriented at an angle.

The nozzles of the tool head can in principle have round opening geometries which are simple to produce. In terms of a cooling and lubricating function of the cooling lubricant, the invention makes it possible also to make in a simple manner a complex nozzle arrangement having a large number of individual nozzles or non-round nozzle cross sections. In particular, the nozzles can have oval or polygonal cross sections (optionally with rounded-out corners and/or curved edges), wherein a combination of a plurality of nozzles of different cross sections is also conceivable within the scope of the invention.

In a first nozzle arrangement, the tool head comprises for each main cutter a plurality of round nozzles, which are respectively lined up side by side along the associated cutter of the tool head such that they together form roughly the shape of an ice hockey stick or of the letter "J", wherein the arrangement of the nozzles respectively has a short arm and a long arm. The short arm—formed, in particular, by two nozzles—is arranged roughly parallel to the centerline. The long arm—for example formed by four nozzles—is arranged exactly, or at least approximately parallel to the main cutter on the associated flank. Hence on both sides of the centerline and next to each main cutter, six round nozzles are respectively shaped.

A second nozzle arrangement comprises two nozzles having an approximately polygonal elongated opening geometry—in particular in the form of an elongate slot with rounded-off corners. Each nozzle once again respectively replicates an ice hockey stick. As in the aforementioned first nozzle arrangement, both nozzles are arranged along the main cutters on the respective flanks such that the short arms are situated on both sides of the centerline.

In a third nozzle arrangement, two approximately rectangular nozzles are arranged parallel to the two main cutters on the flanks. As in the aforementioned nozzle arrangement, the nozzles preferably have rounded-off corners.

In the three aforementioned nozzle arrangements, the arrangement and opening or duct geometry of the nozzles are shaped in such a way close to the cutters of the tool head that the frictional heat which is generated during machine cutting of a workpiece is dissipated particularly effectively to the cooling lubricant. Due to the nozzle geometry, the cooling lubricant, in the above-described nozzle arrangements, is discharged at high speed, which additionally also promotes the evacuation of the chips.

In a fourth nozzle arrangement, two nozzles having approximately kidney-shaped opening geometry are arranged in the flanks of the main cutters. Unlike the aforementioned nozzle arrangements, the nozzles are shaped not directly on a main cutter, but roughly parallel to a rim of the tool head.

Each of the above-described nozzle arrangements is regarded as an independent invention, which can also advantageously be used in isolation from the other features of the inventive tool head or shank tool and of the associated manufacturing method.

In a variant of the tool head—in particular in milling tools which also on their periphery remove material from the workpieces—nozzles can also within the scope of the invention be arranged on mantle surfaces or in the or each chip groove of the tool head. The latter promote, in particular, chip evacuation.

As another aspect if the invention, a shank tool is provided. The shank tool comprises, in addition to a tool head of the above-described type, a main body or tool shank. The tool head is here exchangeably connected to the main body by a coupling structure which is provided on the coupling end and which engages in or receives a corresponding coupling structure on the facing end of the main body. On an opposite end of the main body, a structure for the reception of the shank tool in a machine tool is expediently shaped. This structure is, for instance, a cone, which ensures automatic centering and clamping of the shank tool in the machine tool.

The main body of the shank tool can in principle comprise a plurality of ducts as supply lines for the cooling lubricant. These supply lines are arranged in the main body such that, in a connected state of the main body to the tool head, the openings of the supply lines are brought into congruence with the corresponding inlet opening on the coupling end of the tool head. Advantageously from the production engineering aspect, only one supply line is provided along the rotational axis of the main body, which supply line is arranged congruent with the inlet opening of the duct system of the tool head, in particular in axially central arrangement.

As another aspect of the invention, a method for manufacturing a tool head is provided. In the production method, the preforms are first made separately from each other in respectively an injection molding or diecasting process. The preforms are here respectively formed from a granular material. Next the preforms are put together to form the tool head and are subsequently jointly compressed—in particular in a sintering process—, so that the preforms are integrally and irreversibly bonded. Preferably, the preforms, when put together, are mutually aligned, so that outer structures, such as, for example, chip grooves, are properly connected.

In an expedient implementation of the method, the duct portions of a branched duct system for the cooling lubricant are formed into the preforms, where appropriate, already during the respective shaping process. In particular, injection molding offers various options for the production of penetrations, for instance for shaping suitable hollow structures in a forming tool by the use of movable cores. In this context, straight and short duct portions which are to be shaped are advantageous in terms of the rigidity of the cores, since the granular materials, due to their high viscosity, are injected into the forming tool at high pressures. As a result of the high pressures, long cores can be deformed or displaced and can thus cause geometric deviations of the duct portions.

The connection between the tool head and the main body of the shank tool can in principle be made by a variety of connection methods. In a simple embodiment, the tool head is oriented via the coupling structure on the main body and is integrally bonded to the main body with a solder joint. When the tool head is changed, the solder joint can be undone again by warming. A further embodiment provides for a thread on the coupling structure of the tool head and a corresponding thread on the main body, by which threads the tool head is screwed—preferably counter to the rotation of the shank tool during the machining of the workpiece—to the main body. The advantage of the positive connection lies in simple undoing of the connection between the tool head and the main body.

BRIEF DESCRIPTION OF THE ACCOMPANYING FIGURES

Figure 2:
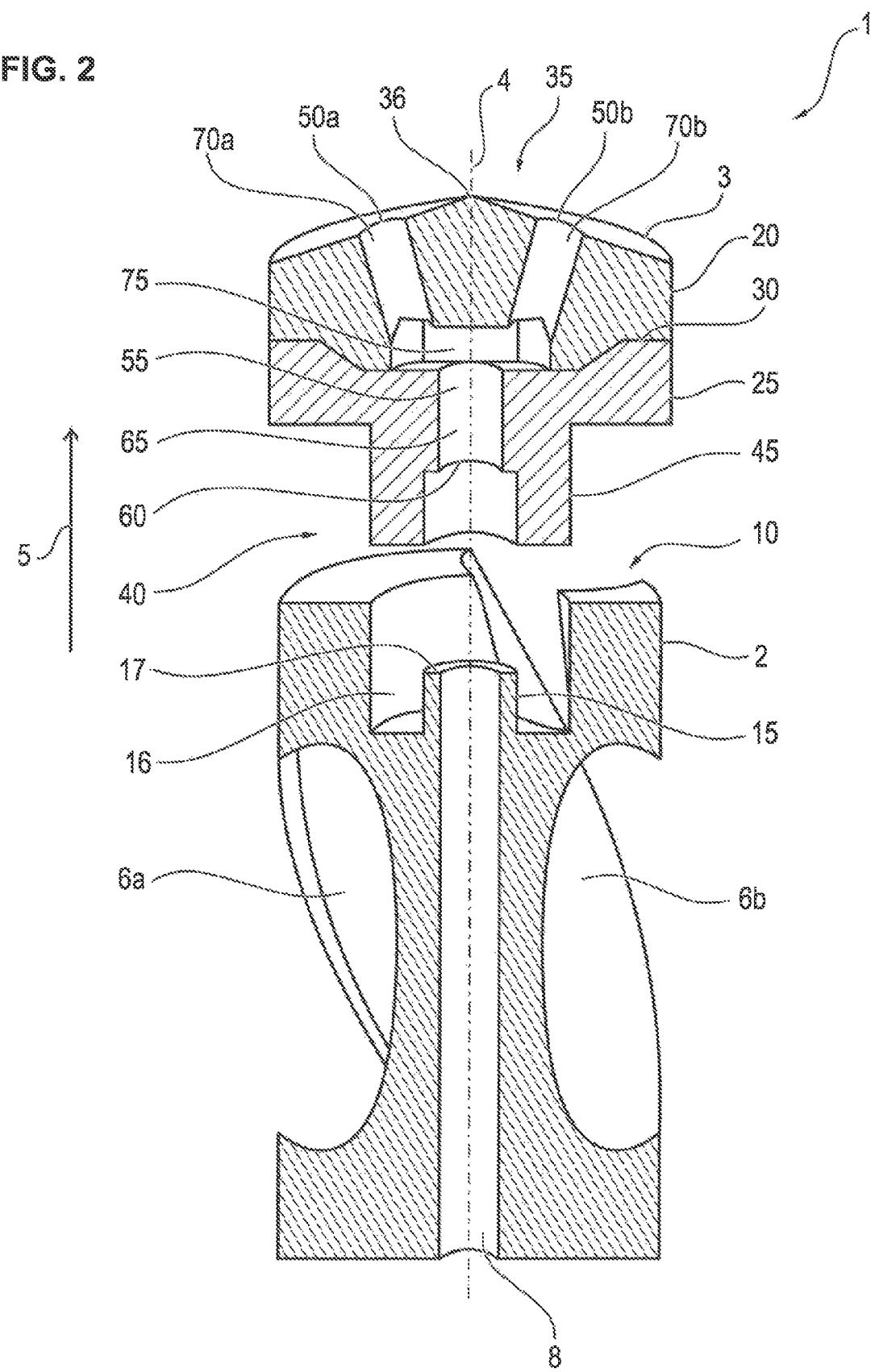
Figure 3:
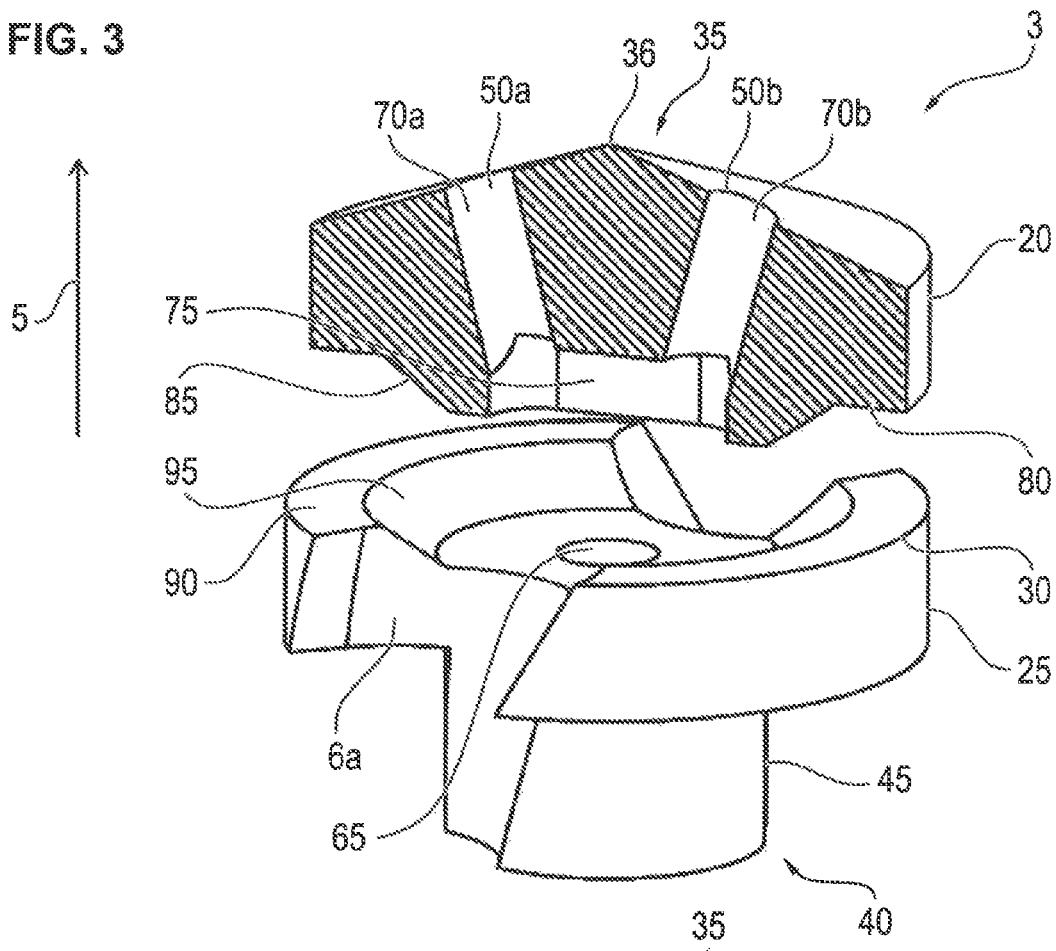
Figure 4:
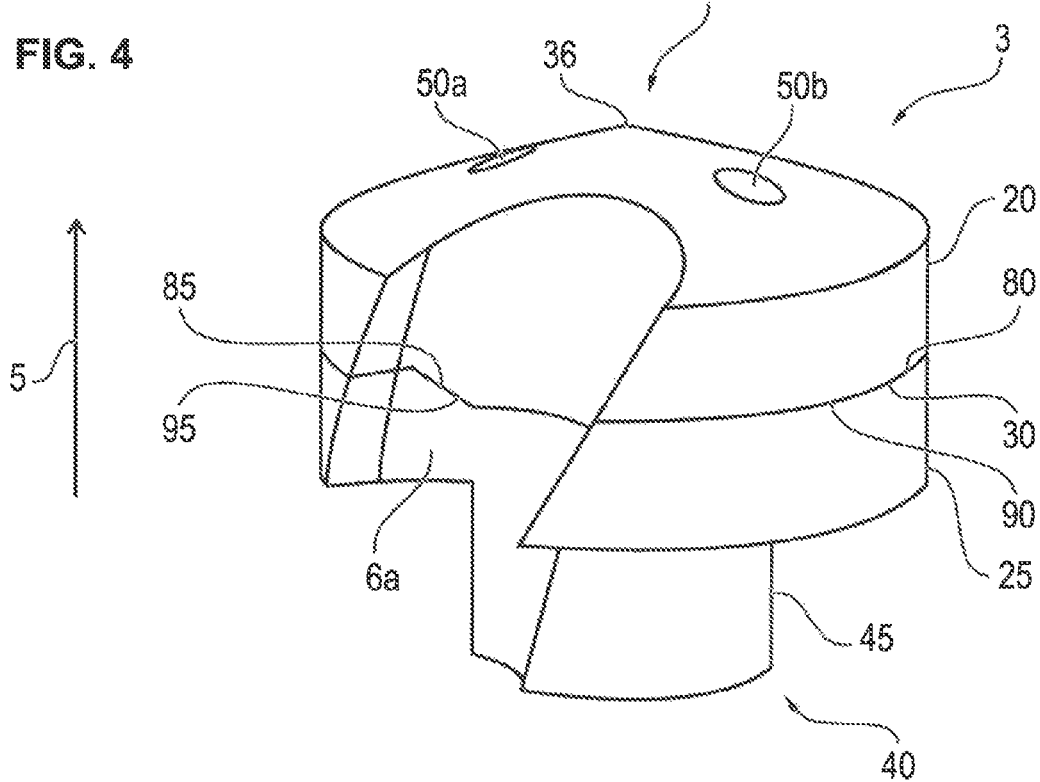
Figure 5:
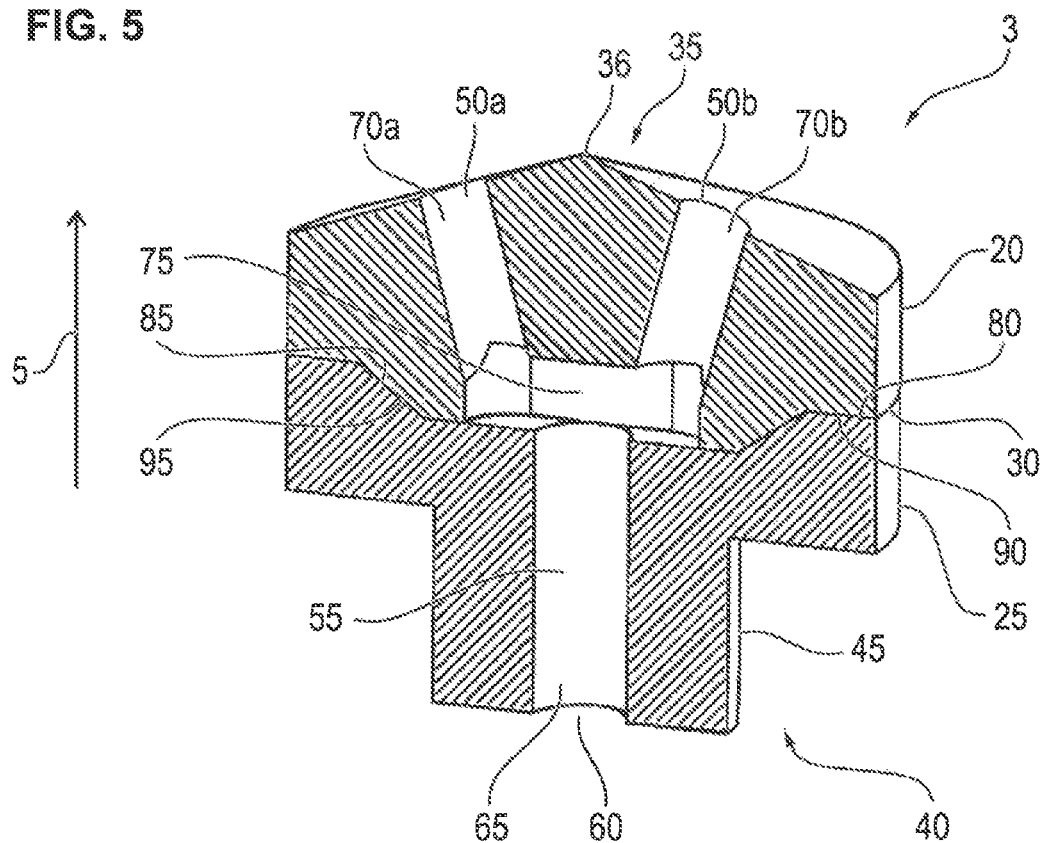
Figure 6:
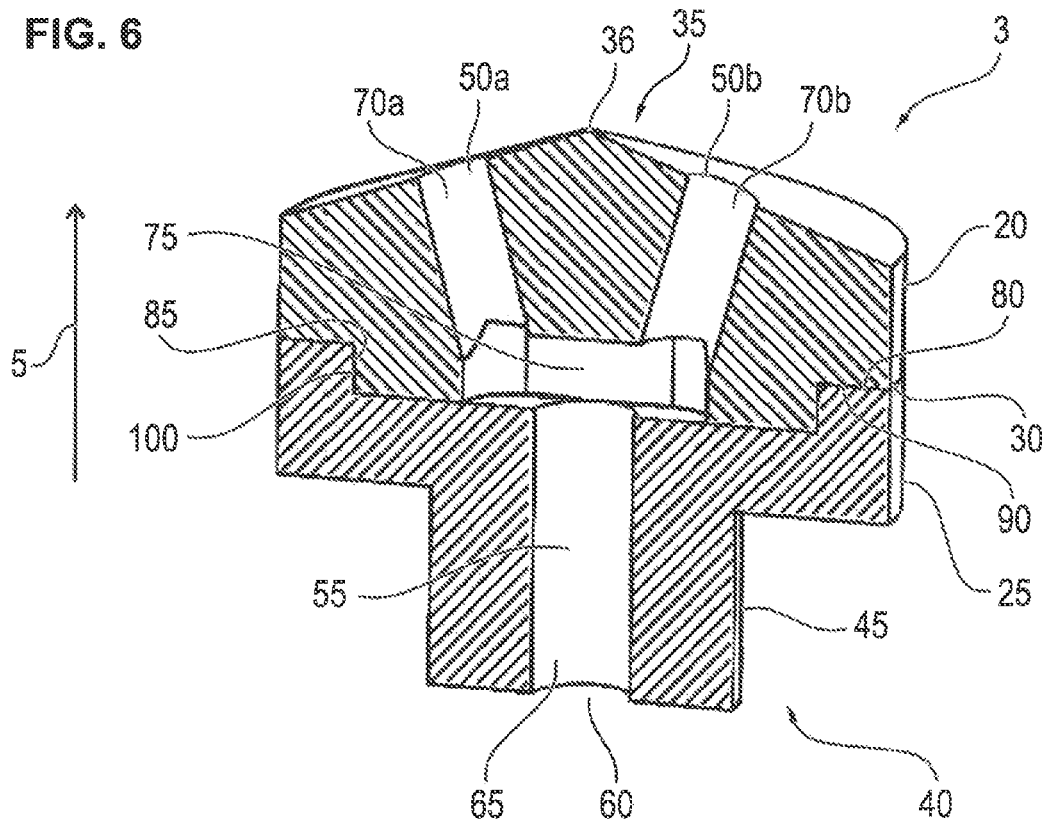
Figure 7:
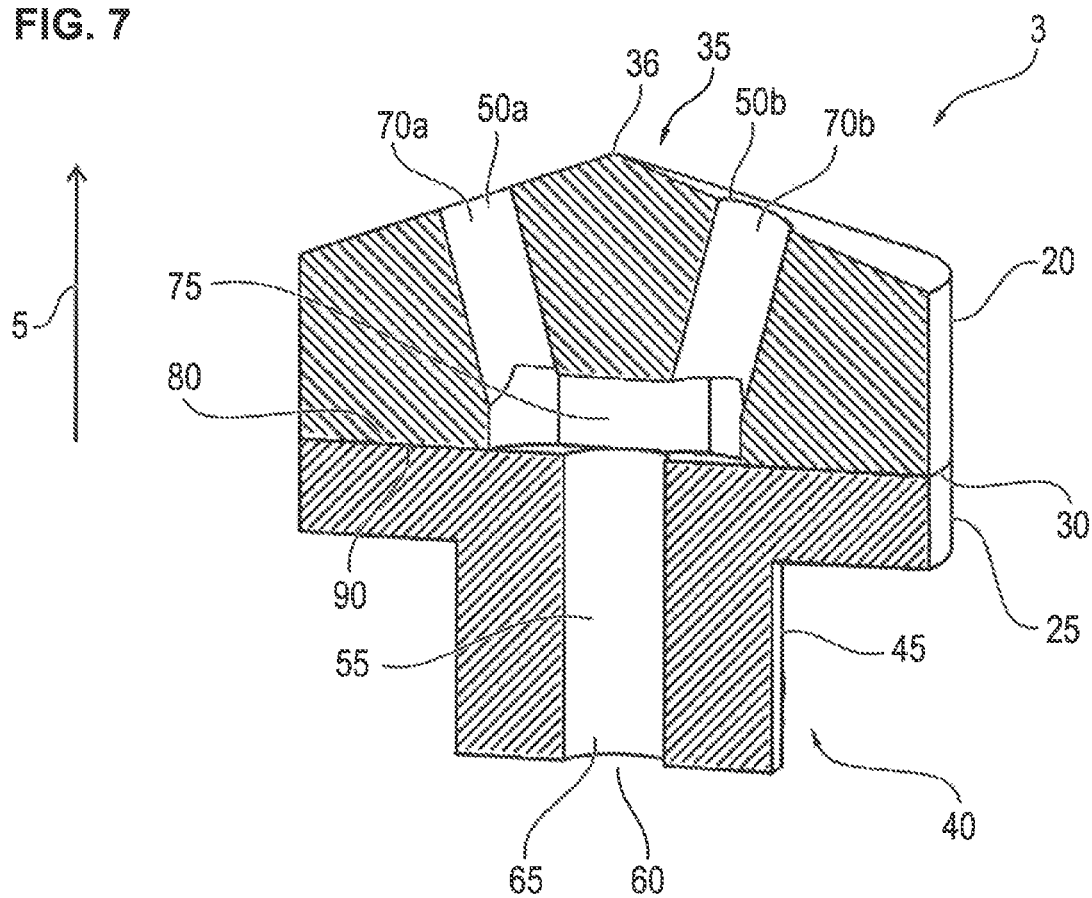
Figure 8:
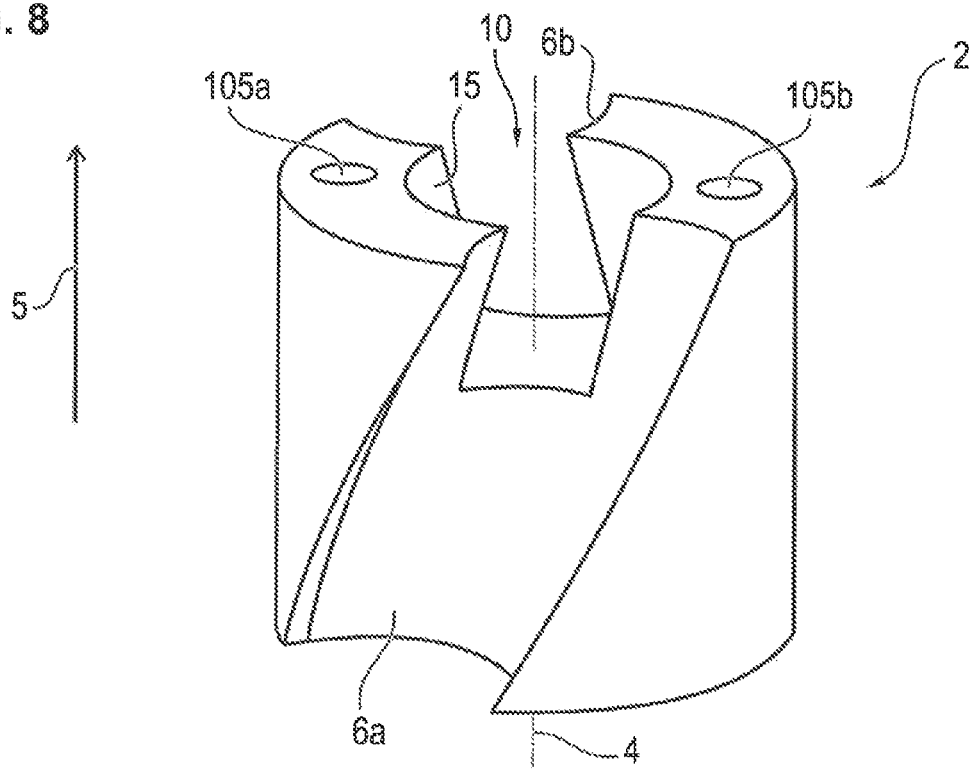
Figure 9:
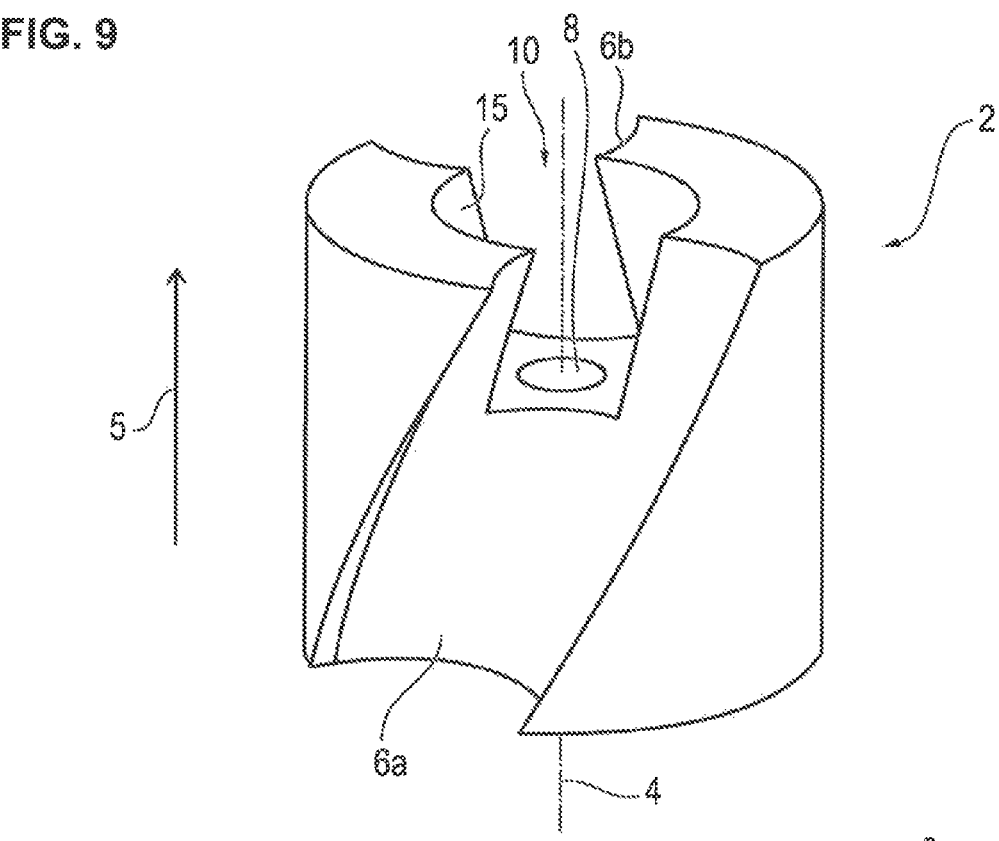
Figure 10:
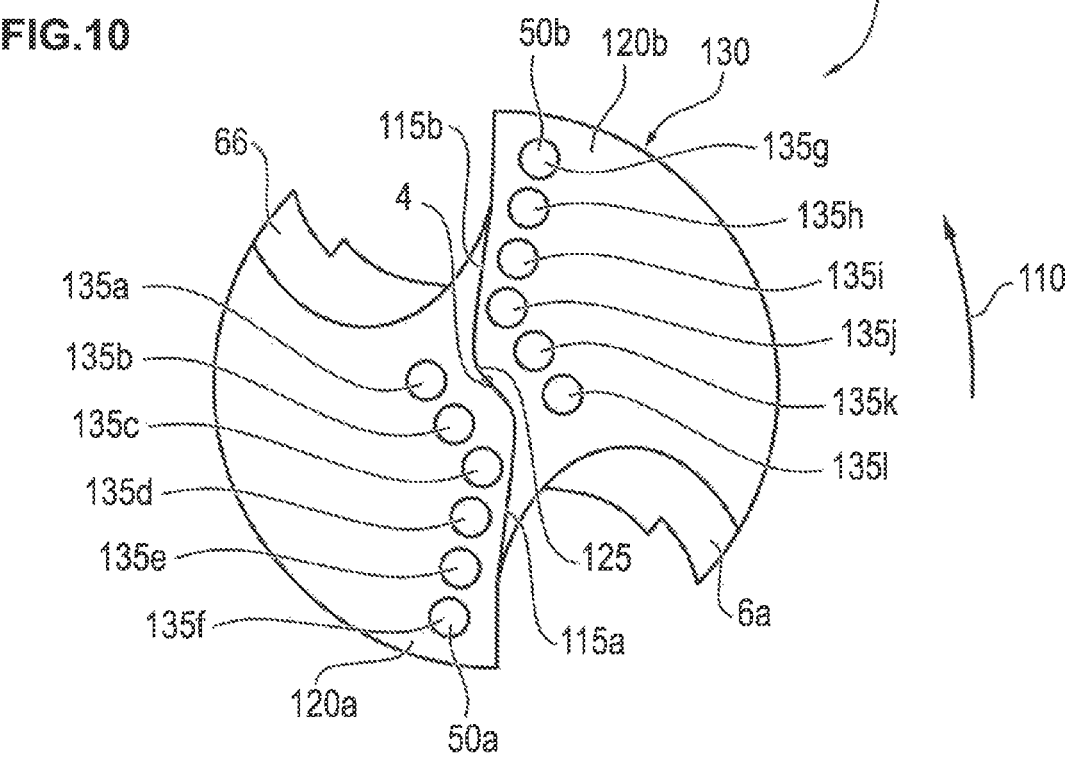
Figure 11:
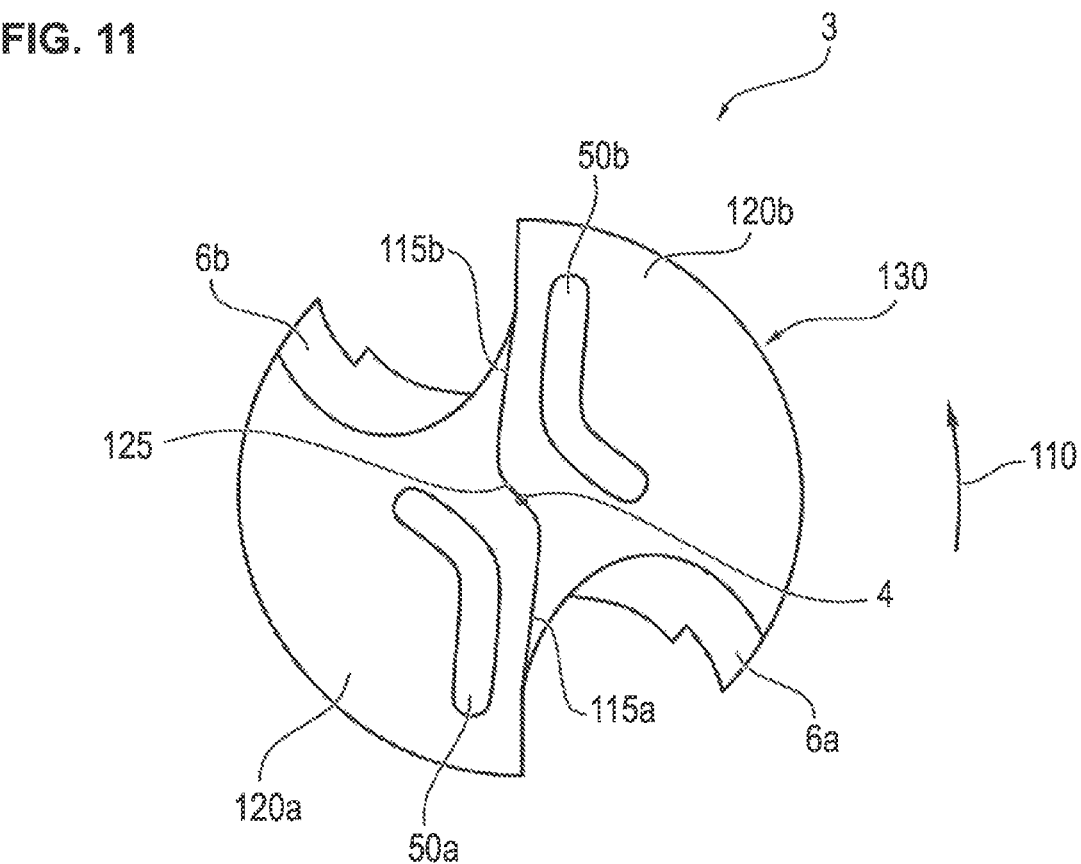
Figure 12:
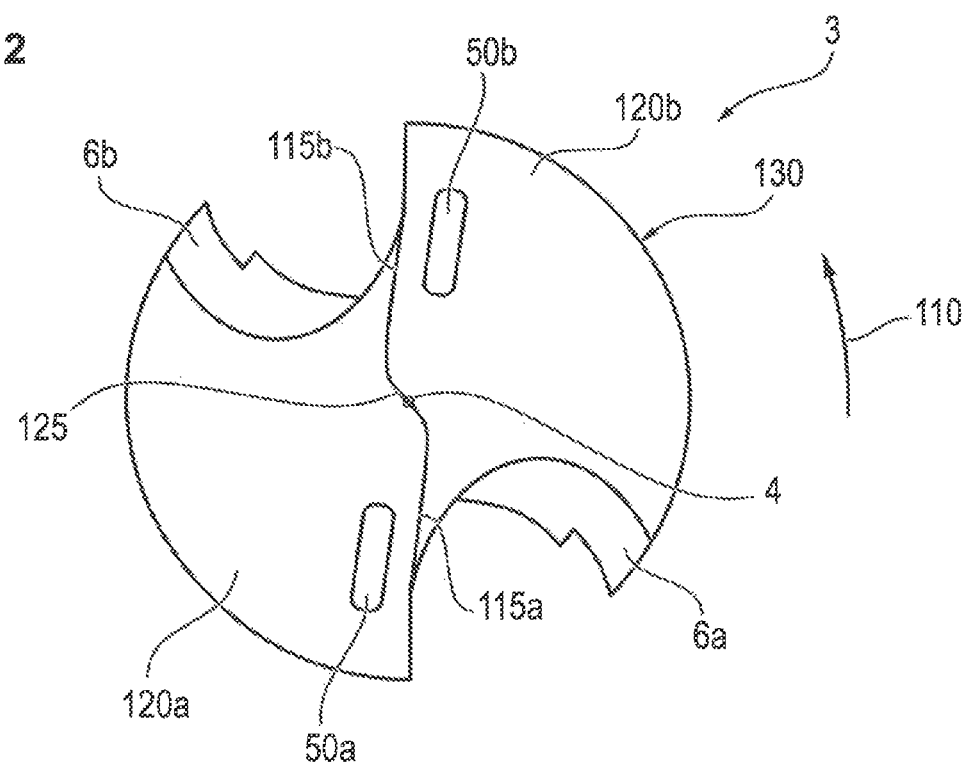
Figure 13:
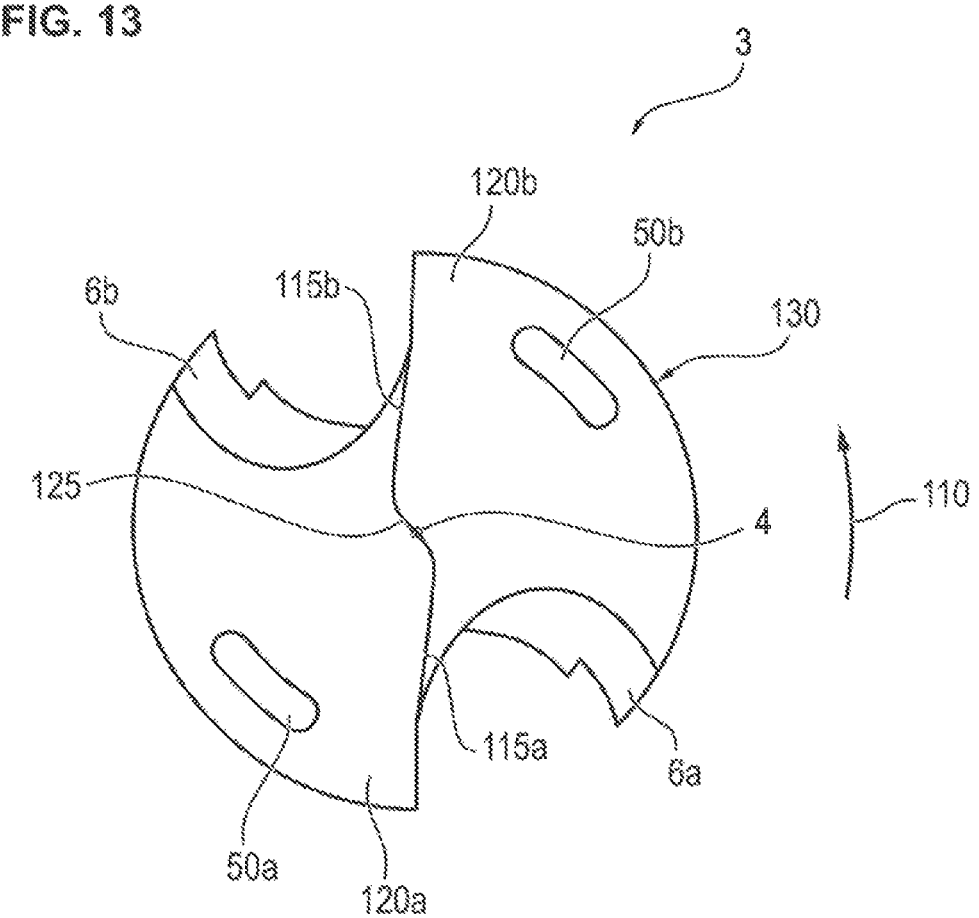
Figure 14:
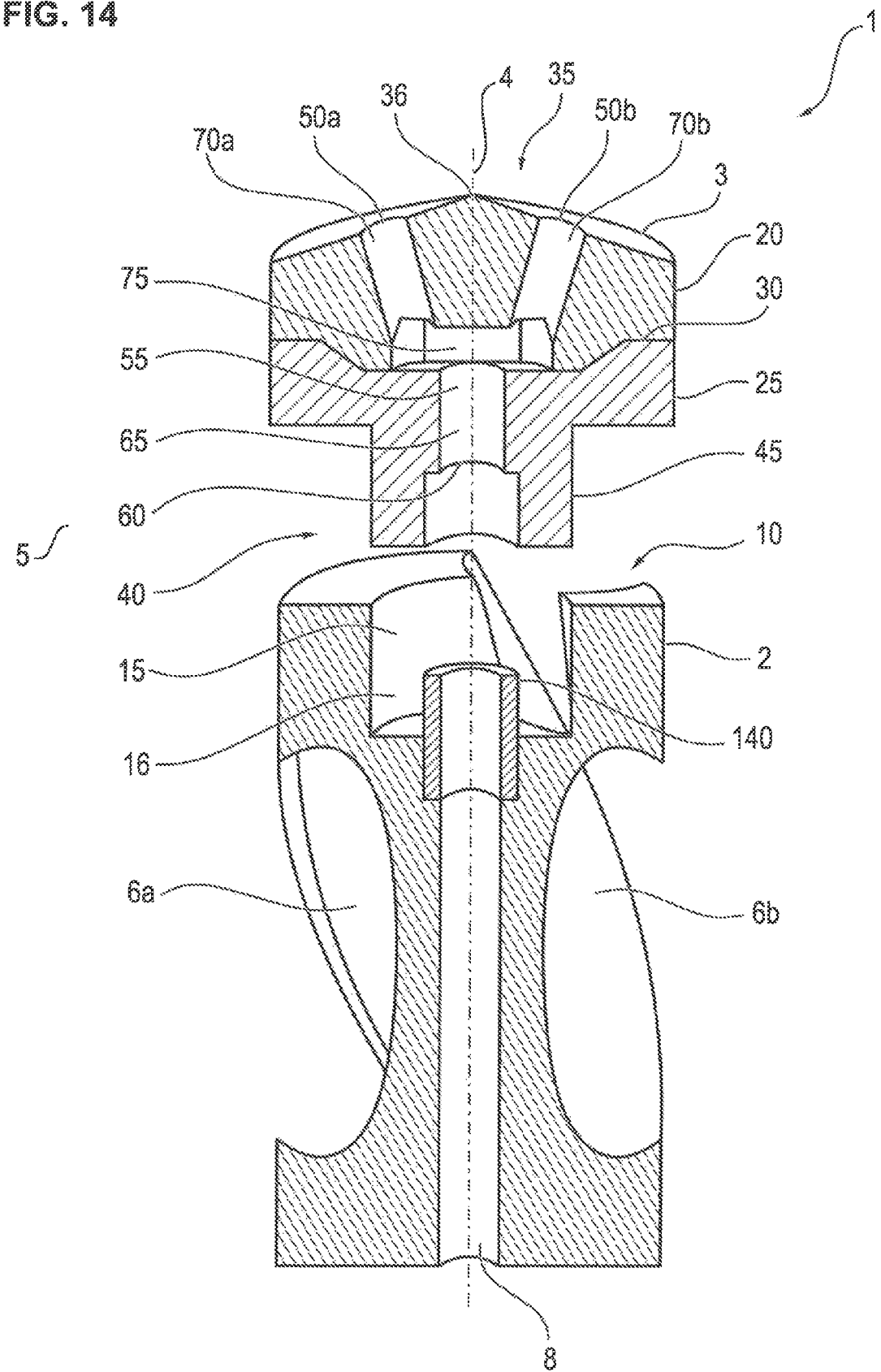

Novel features and characteristics of the disclosure are set forth in the appended claims. The disclosure itself, however, as well as an example mode of use, further objectives and advantages thereof will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 1 shows in schematic representation a modular shank tool comprising a main body and a tool head exchangeably connected thereto, in the assembled state, in accordance with an example embodiment of the present invention, FIG. 2 shows in a representation similar to FIG. 1 the shank tool in an unconnected state, FIG. 3 shows in perspective representation the tool head divided into two preforms (represented partially sectioned), FIG. 4 shows in perspective representation the tool head with the assembled preforms, FIG. 5 shows the tool head in a longitudinal section, FIG. 6 shows in a representation similar to FIG. 5 a further embodiment of the tool head, FIG. 7 shows in a representation similar to FIG. 5 yet another embodiment of the tool head, FIG. 8 shows in perspective representation the main body of the shank tool in a further embodiment, FIG. 9 shows in a representation similar to FIG. 8 the main body of the shank tool in yet a further embodiment, FIG. 10 shows in a top view of a cutter end the tool head with openings for a cooling lubricant in a first nozzle arrangement, FIG. 11 shows in a representation similar to FIG. 10 a second construction of the tool head with an alternative nozzle arrangement, FIG. 12 shows in a representation similar to FIG. 10 a third construction of the tool head with another alternative nozzle arrangement, FIG. 13 shows in a representation similar to FIG. 10 a fourth construction of the tool head with a further nozzle arrangement, and FIG. 14 shows in a representation similar to FIG. 2 a variant of the shank tool with two-piece main body which is featured there.

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF EXEMPLARY EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

FIGS. 1 and 2 show a modular shank tool 1 comprising a main body 2 (also tool shank) and a tool head 3. The represented shank tool 1 is in the form of a rotary tool, namely a drill. A (rotational) axis 4 for a rotary motion of the shank tool 1 during the machine cutting of workpieces runs in a longitudinal direction centrally through the shank tool 1. To the shank tool 1 is assigned a machining direction 5. The machining direction 5 defines a front end of the shank tool 1, with which the latter, in normal operation, is advanced against the workpiece, as well as a rear end opposite to said front end.

In the main body 2 are sunk two chip grooves 6a and 6b, and also a bore, running along the rotational axis 4, as the supply line 8 for a cooling lubricant. At its rear end, the main body 2 has a (non-represented) structure for reception in a machine tool. On the front end of the main body 2 in the machining direction 5, a coupling region 10 is shaped with a coupling structure 15. The coupling structure 15 has a centrally arranged cylindrical recess 16 with a cylindrical pin 17 arranged coaxially therein. The pin 17 projects along the axis 4 in the machining direction 5 and encloses the supply line 8.

The tool head 3 comprises two preforms 20 and 25, which are put together in a connecting zone 30 standing perpendicularly to the axis 4. The front preform 20 in the machining direction 5 has a conically tapered front (cutter) end 35, with cutters for the machine cutting, and a tool tip 36. A rear end of the other, rear preform 25, which rear end thus faces the main body 2, is configured as a coupling end 40 and accordingly bears a coupling structure 45. This coupling structure 45 is realized complementary to the coupling structure 15 of the main body 2, so that automatic centering and connection between the main body 2 and the tool head 3 is ensured. In the tool head 3 are inserted two nozzles 50a and 50b, which are connected by a branched duct system 55 to an inlet opening 60 on the coupling end 40. The branched duct system 55 comprises a straight duct 65 in the rear preform 25 and in each case a straight subduct 70a and 70b in the front preform 20. The duct 65 leads into a distributor chamber 75, which is arranged in the connecting zone 30 in the front preform 20. Branching off from this distributor chamber 75 are the subducts 70a and 70b. The subducts 70a and 70b lead to the nozzles 50a and 50b.

For a secure and, at the same time, releasable connection between the main body 2 and the tool head 3, an external thread is formed onto the coupling structure 45 of the tool head 3. The external thread engages in a corresponding internal thread in the recess 16 of the main body 2. The threads are realized with a spiral opposite to the rotary motion of the shank tool 1, so that the connection between the tool head 3 and the main body 2 is not released during the machining. In FIGS. 1 and 2, the threads are not represented.

FIG. 1 shows the shank tool 1, wherein the main body 2 is fully connected to the tool head 3. The tool head 3 is here oriented and fixed in the main body 2 by the coupling structures 15 and 45 such that the supply line 8 for the cooling lubricant and the inlet opening 60 of the duct system 55 are arranged in mutual alignment. As a result of the threads of the coupling structures 15 and 45, a sufficiently media-tight connection is additionally assured, so that no leakage of the cooling lubricant occurs.

FIG. 2 shows the main body 2 and the tool head 3 in a non-assembled state.

The preforms 20 and 25 of the tool head 3 are respectively separately made in an injection molding process. To this end, a granular material of tungsten carbide and cobalt particles is respectively first converted into a doughy state with a binding agent containing volatile organic components and is then injected at high pressure into an injection mold. The duct system 55 and the duct 65 are here respectively recessed by movable cores in a cavity of the injection mold. After the injection molding operation, the movable cores are withdrawn from the cavity and the respective preform 20 or 25, the injection mold is opened and the preform 20 or 25 is removed from the mold. Next, in a further process step, the volatile components of the binding agent are removed by baking of the preforms 20 and 25.

The preforms 20 and 25 are put together along the connecting zone 30 and are jointly compressed and burnt in a sintering furnace until an integral bond between the preforms 20 and 25 is formed. The tool head 3 finally exists as an integrally coherent component. In following steps, the cutters of the tool head are brought by grinding operations into a definitive form for the machine cutting.

For a precisely fitting assembly and a centering of the preforms 20 and 25 relative to each other, a connecting surface 80 having a conical shoulder 85 is formed on the preform 20 in the connecting zone 30 (see FIGS. 3 to 5).

Corresponding to this connecting surface 80, a connecting surface 90 having a corresponding inner cone 95 is shaped on the preform 25. The chip grooves 6a and 6b of the main body 2 are continued in alignment in the tool head 3.

FIG. 6 shows a further embodiment of the connecting surfaces 80 and 90 between the preforms 20 and 25 for precisely fitting connection and centering. Here the shoulder 85 in the connecting surface 80 of the preform 20, in contrast to the previously described conical embodiment, is of perpendicularly stepped construction. The connecting surface 90 accordingly has no inner cone 95, but rather a shoulder 100 corresponding to the shoulder 85.

FIG. 7 shows a particularly simple embodiment of the connecting surfaces 80 and 90 without shoulder 85 and inner cone 95 or shoulder 100. In this embodiment, the precisely fitting connection is expediently achieved by a centering pin. When the preforms 20 and 25 are put together, the centering pin is inserted into the duct 65.

FIG. 8 shows the main body 2—in an alternative embodiment to FIGS. 1 and 2—with paired supply lines 105a and 105b for the cooling lubricant. The paired supply lines 105a and 105b run parallel to the chip grooves 6a and 6b on an outer rim of the main body 2, wherein the supply lines 105a and 105b lie on a radius around the rotational axis 4 and are in contact with openings in the preform 25. The coupling structure 15 of the main body 2 here comprises the cylindrical recess 16, into which a corresponding mating part of the coupling structure 45 of the tool head 3 is inserted.

A further embodiment of the main body 2, represented in FIG. 9, comprises the central supply line 8 corresponding to the embodiment in FIGS. 1 and 2. In contrast to the embodiment in FIGS. 1 and 2, in this case the central pin 17 is not provided in the recess 16 of the coupling structure 15.

According to FIG. 10, a first alternative nozzle arrangement of the tool head 3 has a cutter geometry for a rotation in a rotational direction 110. In FIG. 10, the rotational direction 110 of the tool head 3 is directed counterclockwise. The cutter geometry comprises two main cutters 115a and 115b. The main cutters 115a and 115b are arranged lagging behind the chip grooves 6a and 6b in the rotational direction 110. Counter to the rotational direction 110, the main cutters 115a and 115b are adjoined by (main) flanks 120a and 120b. The main cutters 115a and 115b are arranged parallel to each other on opposite sides of the tool head 3 and are connected by a centerline 125. The centerline 125 runs through the axis 4. The tool head 3 is delimited in the radial direction by a shell surface 130 (also: peripheral surface), into which the chip grooves 6a and 6b are formed.

In this nozzle arrangement, the nozzles 50a and 50b are represented by respectively six round miniature nozzles 135a to 135l. The miniature nozzles 135a to 135l are arranged directly behind the main cutters 115a and 115b on the respective flanks 120a and 120b. The miniature nozzles 135a to 135l are shaped side by side along the main cutters 115a and 115b and the centerline 125. The centerline is thereby bordered on both sides by the miniature nozzles 135a to 135c and 135j to 135l. The arrangement of the lined-up miniature nozzles 135a to 135l corresponds to the shape of two ice hockey sticks having respectively a long arm along the main cutters 115a and 115b and respectively a short arm along the centerline 125.

A second alternative nozzle arrangement of the tool head 3 has two polygonal, slot-shaped angled nozzles 50a and 50b with rounded-off corners (FIG. 11). Comparably to FIG. 10, the shapes of the angled nozzles 50a and 50b likewise correspond to two ice hockey sticks. The long arms of the angled nozzles 50a and 50b are once again arranged along the main cutters 115a and 115b on the associated flanks 120a and 120b. The short arms are shaped parallel to and on both sides of the centerline 125.

In a third alternative nozzle arrangement according to FIG. 12, the nozzles 50a and 50b are realized as rectangles with rounded-off corners or straight slots along the main cutters 115a and 115b. As in the previously described nozzle arrangements (FIGS. 10 and 12), the nozzles 50a and 50b are shaped in the flanks 120a and 120b.

A fourth alternative nozzle arrangement of the tool head 3 comprises, in turn, two slot-shaped, kidney-shaped nozzles 50a and 50b. According to FIG. 13, the slot-shaped nozzles 50a and 50b are curved parallel to the mantle surface 130 and are shaped along the mantle surface 130 in the flanks 120a and 120b.

The main body 2 (previously represented in one piece) can also be realized within the scope of the invention in multipart construction. In a variant of the shank tool 1 according to FIGS. 1 and 2, which variant is represented in FIG. 14, that pin 17 of the main body 2 which is featured there is by way of example thus replaced by a separate transition unit 140 (here in the form of a sleeve). The transition unit 140 preferably consists of soft metal (in particular brass) or rubber and serves for better sealing of the transition between the duct system 55 and the supply line 8.

The subject of the invention is not limited to the above-described illustrative embodiments. Rather, further embodiments of the invention can be derived from the above description by the person skilled in the art. In particular, those individual features of the invention which are described with reference to the various illustrative embodiments, and the design variants thereof, can also be differently combined with one another.

The invention claimed is:

1. A method for manufacturing a tool head for use with a modular shank tool, wherein the tool head has a central longitudinal axis about which the tool head rotates during operation, the method comprising, prior to connecting the tool head to a tool shank of the shank tool:
    producing at least two preforms of the tool head separately from each other in an injection molding or diecasting process from granular materials;
    abutting the at least two preforms together in a desired relationship; and
    integrally bonding the at least two preforms together by jointly compressing the at least two preforms,
    wherein said producing step comprises forming at least one linear duct in one of the at least two preforms and at least one distributor chamber disposed in the other one of the at least two preforms,
    wherein the at least one distributor chamber is in fluid communication with the at least one linear duct in one of the at least two preforms, and
    wherein the at least one distributor chamber has a larger cross-sectional area than the at least one linear duct in one of the at least two preforms.

2. The method of claim 1, wherein said producing comprises forming each of the at least two preforms from a different material.

3. The method of claim 1, wherein:
    said producing step comprises producing a first preform and a second preform, wherein:
        the first preform comprises a cutter end structured to engage a workpiece; and
        the second preform comprises a coupling end structured to connect the tool head to a tool shank of the modular shank tool;

wherein the coupling end comprises a coupling structure which is structured to connect to the tool shank in a manner which can be undone.

4. A method for manufacturing a tool head for use with a modular shank tool, wherein the tool head has a central longitudinal axis about which the tool head rotates during operation, the method comprising, prior to connecting the tool head to a tool shank of the shank tool:
producing a first preform and a second preform of the tool head separately from each other in an injection molding or diecasting process from granular materials, wherein:
the first preform comprises a cutter end structured to engage a workpiece; and
the second preform comprises a coupling end structured to connect the tool head to a tool shank of the modular shank tool;
abutting the first preform and the second preform together in a desired relationship;
integrally bonding the first preform and the second together by jointly compressing the first preform and the second preform to form an integral bond along a connecting zone,
wherein said producing step comprises forming a duct system for a cooling lubricant, the duct system comprising a straight duct portion disposed in the second preform and a distributor chamber disposed in the first preform, the straight duct portion leading into the distributor chamber, the distributor chamber having a larger cross-sectional area than the straight duct portion disposed in the second preform.

5. The method of claim 4, wherein:
the cutter end is disposed axially opposite the connecting zone in the first preform,
the coupling end comprises a coupling structure disposed axially opposite the connecting zone in the second preform; and
the coupling structure is structured to engage a complementary shaped structure of the tool shank, for coupling the tool head to the tool shank in a releasable manner.

6. The method of claim 5, wherein the coupling structure comprises a thread structured to engage a corresponding thread of the tool shank.

7. The method of claim 4, wherein the connecting zone runs approximately perpendicular to the central longitudinal axis of the tool head and does not extend into the first preform at the central longitudinal axis.

8. The method of claim 7, wherein the first preform does not apply a compressive radial force with respect to the second preform subsequent to said bonding.

9. The method of claim 4, wherein the connecting zone comprises one or more conical regions.

10. The method of claim 4, wherein the connecting zone has a major dimension which runs perpendicular to the central longitudinal axis and a minor dimension which runs parallel with respect to the central longitudinal axis, the major dimension being greater than the minor dimension.

11. The method of claim 4, wherein the cutter end includes at least one outlet opening for the cooling lubricant, wherein the at least one outlet opening is connected by the duct system to at least one inlet opening for the cooling lubricant on the coupling end.

12. The method of claim 11, wherein the at least one outlet opening includes an opening geometry that is round, oval or substantially polygonal.

13. The method of claim 11, wherein the at least one outlet opening includes at least two outlet openings which are connected by the duct system to a common inlet opening on the coupling end.

14. The method of claim 4, wherein said forming of a duct system comprises forming straight subduct portions disposed in the first preform.

15. The method of claim 14, wherein:
the distributor chamber is in fluid communication with the straight subduct portions disposed in the first preform and the straight duct portion disposed in the second preform; and
the distributor chamber has a larger cross-sectional area than the straight subduct portions disposed in the first preform.

16. The method of claim 4, wherein:
said producing of the first preform comprises forming an end face which is disposed axially opposite the cutter end, and at the connecting zone; and
the distributor chamber has an inlet for the cooling lubricant disposed axially away from the cutter end, wherein the inlet is flush with the end face.

* * * * *